United States Patent
Shah et al.

(10) Patent No.: US 11,584,044 B2
(45) Date of Patent: Feb. 21, 2023

(54) METHODS OF FORMING NEAR-NET FIBER REINFORCED THERMOPLASTIC COMPOSITE COMPONENTS

(71) Applicant: GM GLOBAL TECHNOLOGY OPERATIONS LLC, Detroit, MI (US)

(72) Inventors: Bhavesh Shah, Troy, MI (US); William R. Rodgers, Bloomfield Township, MI (US); Mark A. Voss, Richmond, MI (US); Terrence Wathen, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 581 days.

(21) Appl. No.: 16/555,762

(22) Filed: Aug. 29, 2019

(65) Prior Publication Data
US 2021/0060882 A1 Mar. 4, 2021

(51) Int. Cl.
*B29C 35/02* (2006.01)
*B29C 35/08* (2006.01)
(Continued)

(52) U.S. Cl.
CPC .......... *B29C 35/0805* (2013.01); *B29C 35/02* (2013.01); *B29C 35/16* (2013.01);
(Continued)

(58) Field of Classification Search
None
See application file for complete search history.

(56) References Cited

U.S. PATENT DOCUMENTS 7,226,665 B2 6/2007 Kia et al.
9,650,003 B2 5/2017 Owens et al.
(Continued)

OTHER PUBLICATIONS

Gergely, Ryan et al., U.S. Appl. No. 15/906,793, filed Feb. 27, 2018 entitled "Composite Energy-Absorbing Assembly Having Discrete Energy-Absorbing Elements Supported by a Carrier Plate", 76 pages.

(Continued)

*Primary Examiner* — Jacob T Minskey
*Assistant Examiner* — Adrien J Bernard
(74) *Attorney, Agent, or Firm* — Harness, Dickey & Pierce, P.L.C.

(57) ABSTRACT

A method is provided for forming a near-net thermoplastic composite component includes co-spraying a mixture comprising a thermoplastic polymer material and a chopped reinforcing material deposited onto at least one region associated with a tool having a first temperature and defining a near-net component shape. The mixture and adjacent tool is heated to a second temperature while the mixture is on the tool. The first temperature is below the solidification temperature of the thermoplastic polymer material and the second temperature is above the solidification temperature. Then, the mixture is exposed to a negative pressure to promote removal of gases from the mixture and put under compressive force to densify the mixture. The thermoplastic polymer material melts and flows. The tool is cooled to the first temperature and removing the mixture to form the near-net thermoplastic composite component having randomly oriented chopped reinforcement material distributed within a thermoplastic polymer matrix.

20 Claims, 8 Drawing Sheets

(51) Int. Cl.
    *B29D 28/00*     (2006.01)
    *B29C 70/30*     (2006.01)
    *B29C 70/34*     (2006.01)
    *B29C 35/16*     (2006.01)
    *B29C 70/46*     (2006.01)

(52) U.S. Cl.
    CPC ............ *B29C 70/305* (2013.01); *B29C 70/34* (2013.01); *B29C 70/46* (2013.01); *B29D 28/005* (2013.01); *B29C 2035/0283* (2013.01)

(56) References Cited

U.S. PATENT DOCUMENTS

| | | |
|---|---|---|
| 9,896,783 B2 | 2/2018 | Kia |
| 10,113,250 B2 | 10/2018 | Kia |
| 10,293,770 B2 | 5/2019 | Owens et al. |
| 10,358,767 B2 | 7/2019 | Kia et al. |
| 10,406,794 B2 | 9/2019 | Rodgers et al. |
| 11,077,812 B2 | 8/2021 | Rodgers et al. |
| 2004/0071935 A1 | 4/2004 | Kia et al. |
| 2012/0199263 A1* | 8/2012 | Thomas ............ D04H 1/64 156/62.2 |
| 2014/0077412 A1* | 3/2014 | Taniguchi ............ F25B 49/02 264/257 |
| 2016/0023405 A1* | 1/2016 | Wagner ............ B32B 5/12 428/292.1 |
| 2017/0072656 A1* | 3/2017 | Dodworth ............ B29C 70/345 |
| 2018/0085991 A1 | 3/2018 | Kia et al. |
| 2019/0264769 A1 | 8/2019 | Gergely et al. |

OTHER PUBLICATIONS

Rodgers, William R. et al., U.S. Appl. No. 15/907,036, filed Feb. 27, 2018 entitled "Composite Energy-Absorbing Assembly", 49 pages.

\* cited by examiner

METHODS OF FORMING NEAR-NET FIBER REINFORCED THERMOPLASTIC COMPOSITE COMPONENTS

INTRODUCTION

This section provides background information related to the present disclosure which is not necessarily prior art.

In various aspects, the present disclosure provides methods of making near-net thermoplastic composite components having at least one reinforcing material and a thermoplastic polymer matrix.

Compression molded thermoplastic parts are formed by using blank sheets, which are pre-consolidated fiber-reinforced resin mats, as a feedstock. In certain aspects, randomly oriented chopped carbon fiber reinforced thermoplastic (CFRTP) composite parts can be made by such compression molding processes. These blank sheets are cut to an appropriate shape for forming a part prior to molding. This step of cutting the blanks to the part shape creates a significant amount of scrap material. The cut sheets are then heated above the melting point of the resin, followed by placement in a tool where the molding occurs. The melted resin solidifies and has the form of the tool. Part design may necessitate complex end-of-arm tooling to transfer the blank and accomplish the required "tucking" of the blank into the tool (for example, to ensure that the blank conforms to the complex surface contouring) prior to solidification of the resin and part formation.

Compression molding processes used to form randomly oriented chopped fiber reinforced thermoplastic composite parts may involve numerous process steps, including potential use of end-of-arm tooling. Further, such processes may involve significant scrap when trimming a blank. Lastly, compression molding processes using blanks can encounter potential issues with a dearth of good polymer distribution around the reinforcement fibers, uneven distribution or concentrations of fibers with the thermoplastic polymer matrix, and lastly, not permitting customization of materials within a near-net shaped composite part due to the use of a single blank having a uniform composition.

SUMMARY

This section provides a general summary of the disclosure, and is not a comprehensive disclosure of its full scope or all of its features.

In certain variations, the present disclosure relates to methods of forming a near-net thermoplastic composite component. The method may include co-spraying a mixture including a thermoplastic polymer material and a chopped reinforcing material deposited onto at least one region associated with a tool having a first temperature and defining a near-net component shape. The mixture is heated to a second temperature while the mixture is on the tool. The first temperature is below the solidification temperature of the thermoplastic polymer material and the second temperature is above a solidification temperature of the thermoplastic polymer material, so that the thermoplastic polymer material flows. The mixture on the tool is exposed to a negative pressure to promote removal of gases from the mixture. Compressive force is then applied to the mixture. The method also includes cooling the tool to the first temperature and removing the mixture to form the near-net thermoplastic composite component having randomly oriented chopped reinforcement material distributed within a thermoplastic polymer matrix.

In one aspect, the at least one region associated with a tool includes a first region and a second distinct region. The first region includes a first material composition and the second distinct region has a second material composition. The first material composition and the second material composition are distinct from one another.

In one aspect, the method further includes heating the tool to the first temperature.

In one aspect, the heating the mixture to the second temperature includes inductively heating a surface of the tool so that the thermoplastic polymer material melts and flows during the applying compressive force to the mixture.

In one aspect, the heating the mixture to the second temperature includes heating the mixture with one or more infrared heaters so that the thermoplastic polymer material melts and flows during the applying compressive force to the mixture. The one or more infrared heaters are movable relative to the tool and are moved over the tool after the co-spraying and removed prior to the applying compressive force to the mixture.

In one aspect, the tool includes at least two complementary parts that are closed and sealed together prior to the exposing the mixture on the tool to the negative pressure and the applying compressive force to the mixture.

In one aspect, the chopped reinforcing material is selected from the group consisting of: carbon, glass, basalt, polyparaphenylene terephthalamide, hemp, kenaf, and combinations thereof. The thermoplastic polymer is selected from the group consisting of: nylon 6, nylon 66, nylon 12, polyethylene, polypropylene, polycarbonate, polyacrylates, polymethylmethacrylate, acrylonitrile-butadiene-styrene (ABS), polycarbonate and acrylonitrile-butadiene-styrene blend (PC-ABS), polybutyl ene terephthalate and polycarbonate blend (PBT and PC), polyphenylene oxide, polyetherimide, and combinations thereof.

In one aspect, the thermoplastic polymer material is in the form of a powder having an average particle diameter of greater than or equal to about 0.3 µm to less than or equal to about 300 µm.

In one aspect, an amount of a thermoplastic polymer matrix in the thermoplastic composite component is greater than or equal to about 40 volume % to less than or equal to about 95 volume %.

In one aspect, the thermoplastic polymer material and the chopped reinforcing material are electrostatically charged during the co-spraying to facilitate the depositing onto the at least one region associated with the tool.

In certain other variations, the present disclosure relates to methods of forming a near-net thermoplastic composite component. The method includes spray chopping a mixture including a thermoplastic polymer material and a chopped reinforcing material deposited onto at least one region associated with a tool having a first temperature and defining a near-net component shape. The method also includes heating the mixture to a second temperature. The first temperature is below the solidification temperature of the thermoplastic polymer material and the second temperature is above a solidification temperature of the thermoplastic polymer material, so that the thermoplastic polymer material flows. The mixture on the tool is exposed to a negative pressure to promote removal of gases from the mixture. Compressive force is then applied to the mixture. The method includes cooling the tool to the first temperature and removing the mixture to form the near-net thermoplastic composite component having randomly oriented chopped reinforcement material distributed within a thermoplastic polymer matrix.

In one aspect, the spray chopping includes feeding the thermoplastic polymer material as a powder into a spray chop gun and also feeding a fiber of the reinforcing material into the spray chop gun to form the chopped reinforcing material that is deposited onto at least one region.

In one aspect, the spray chopping includes feeding a string of thermoplastic polymer material into a spray chop gun and also feeding a fiber of the reinforcing material into the spray chop gun that forms chopped thermoplastic polymer material and the chopped reinforcing material deposited onto the at least one region.

In one aspect, a first diameter of the string of the thermoplastic polymer material is greater than or equal to about 0.5 to less than or equal to about 3 times a second diameter of the fiber of the reinforcing material.

In one aspect, the chopped reinforcing material is selected from the group consisting of: carbon, glass, basalt, polyparaphenylene terephthalamide, hemp, kenaf, and combinations thereof. The thermoplastic polymer is selected from the group consisting of: nylon 6, nylon 66, nylon 12, polyethylene, polypropylene, polycarbonate, polyacrylates, polymethylmethacrylate, acrylonitrile-butadiene-styrene (ABS), polycarbonate and acrylonitrile-butadiene-styrene blend (PC-ABS), polybutyl ene terephthalate and polycarbonate blend (PBT and PC), poly phenylene oxide, polyetherimide, and combinations thereof.

In one aspect, the thermoplastic polymer material and the chopped reinforcing material are electrostatically charged during the spray chopping to facilitate the depositing onto the at least one region associated with the tool.

In certain other variations, the present disclosure relates to methods of forming a near-net thermoplastic composite component. The method includes co-spraying a mixture including a thermoplastic polymer material and a chopped reinforcing material onto at least one region of a perforated screen disposed in a tool having a first temperature and defining a near-net component shape. The mixture is heated to a second temperature while the mixture is on the perforated screen. The first temperature is below the solidification temperature of the thermoplastic polymer material and the second temperature is above a solidification temperature of the thermoplastic polymer material, so that the thermoplastic polymer material flows. The mixture on the perforated screen is exposed to a negative pressure to promote removal of gases from the mixture. The method also includes applying compressive force to the mixture and cooling the mixture and tool to the first temperature. The mixture is removed from the perforated screen to form the near-net thermoplastic composite component having randomly oriented chopped reinforcement material distributed within a thermoplastic polymer matrix.

In one aspect, during the co-spraying, the perforated screen is raised above a surface of the tool to promote fluid flow through the perforated screen during the co-spraying and prior to the exposing the mixture to the negative pressure, the perforated screen is translated adjacent to the surface of the tool.

In one aspect, the tool includes at least two complementary parts that are closed and sealed together prior to the exposing the mixture on the perforated screen to the negative pressure and applying compressive force to the mixture.

In one aspect, the thermoplastic polymer material and the chopped reinforcing material are electrostatically charged during the co-spraying to facilitate the mixture being deposited onto the at least one region of the perforated screen.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 1A-1B.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the stated numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure pertains to new methods of manufacturing thermoplastic composite parts or components. For example, methods of forming a thermoplastic composite component, for example, a near-net shaped thermoplastic component may include co-spraying a mixture comprising a thermoplastic polymer material and a chopped reinforcing material. The co-spraying deposits the mixture onto at least one region associated with a tool having a first temperature. The mold may define a near-net component shape. The mixture then heated to a second temperature while the mixture is on the tool. The first temperature is below the solidification temperature of the thermoplastic polymer material and the second temperature is above the solidification temperature. As will be described in greater detail below, the first temperature is above ambient temperatures. The tool may include at least two complementary parts that are closed and sealed together prior to the exposing the mixture on the tool to the negative pressure. Next, the mixture deposited on a surface of the interior of the tool is exposed to a negative pressure to promote removal of gases from the mixture followed by being exposed to a compressive force. The compressive force can be applied by compressing the at least two complementary parts together, by way of example. In this manner, the thermoplastic polymer material melts and flows having been heated in the mold having the second temperature while gases are removed. The applying of the compressive force serves to compress and densify the mixture. Finally, the mixture is cooled to the first temperature, which also includes cooling the tool to at or near the first temperature. The mixture may be removed from the tool. The mixture forms the thermoplastic composite component having randomly oriented chopped reinforcement material distributed within a thermoplastic polymer matrix. The component thus formed may be a near-net thermoplastic composite component.

Figure 1A:
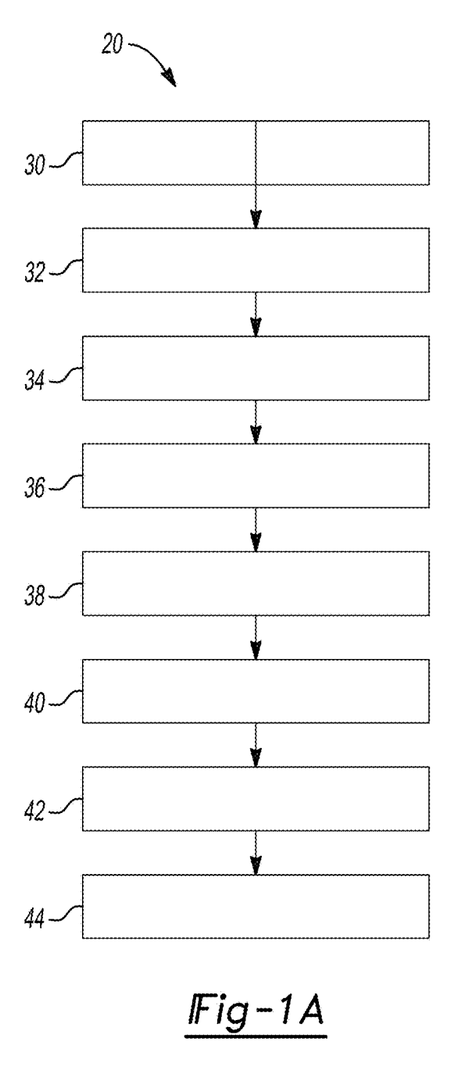
FIG. 1A shows a compression molding process having a blanking operation.
Figure 1B:
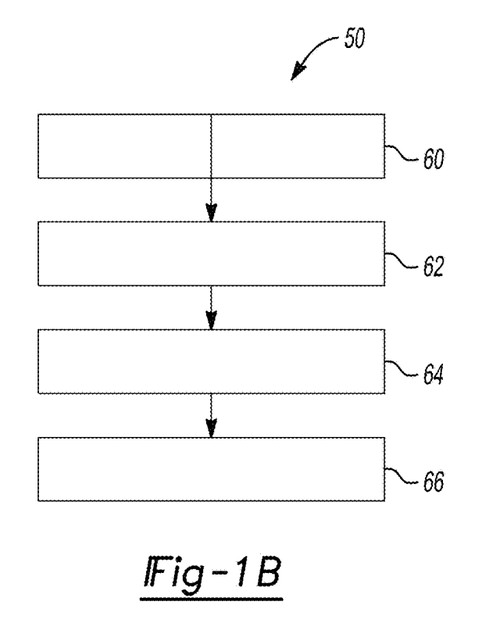
FIG. 1B shows a molding process employing a co-spraying technique to form a near-net thermoplastic composite component according to certain aspects of the present disclosure.

By way of background, FIGS. 1A and 1B show distinct compression molding processes. FIG. 1A shows a compression molding process 20 that employs a blank to create a compression molded thermoplastic composite component. FIG. 1B is a method 50 according to certain aspects of the present disclosure that employs a co-spraying technique for forming a molded thermoplastic composite component, where the process is free of any blanking operations. In FIG. 1A, at step 30, a fiber, such as carbon fiber and a thermoplastic resin, such as a polyamide or nylon, are combined together. A dry manufacturing step 32 is conducted to form a sheet of the fiber and thermoplastic resin that defines a prefabricated blank that serves as a precursor for downstream compression molding. Generally, a blank is a pre-consolidated fiber reinforced resin mat that is used as a feedstock. Next, at 34, the blank may be cut into a pattern that corresponds to a tool shape that will mold the composite component to be formed. Notably, any scrap materials generated from the cut blank cannot be self-line recycled, because the thermoplastic material is virgin non-recycled material in the blanks to avoid nonuniformity of material properties in the final product. Thus, the scrap materials generated from cutting the blank are waste and cannot be recycled in this process.

At 36, an oven is preheated to a processing temperature above the melting point of the thermoplastic resin. The blank is placed in the oven and thus preheated. A transfer step 38 then occurs which transfers the heated blank to a tool or die. A draping step 40 then is conducted, where the blank is manipulated to more closely fit into the shape of the interior regions of the tool or die. This step 40 may involve use of an end-of-arm tool where the part shape is particularly complex. The tool typically includes at least two complementary parts that are closed and sealed together. The heated blank may then be compressed at 42, where pressure is applied to consolidate the part. Finally, at step 44, the reinforced thermoplastic composite part is cooled in the die, the distinct portions of the tool are opened, and the compression molded reinforced thermoplastic composite part is removed from the die.

In the method 50 in FIG. 1B, at step 60, a fiber, such as chopped carbon fiber and a thermoplastic resin, such as a polyamide or nylon, are combined together. At 62, a mixture comprising the thermoplastic resin and a chopped reinforcing fiber are deposited onto at least one region associated with a tool. The tool may define a near-net component shape for the part to be formed. The thermoplastic mixture is then heated in order to soften and melt the thermoplastic matrix. The tool typically includes at least two complementary parts that are closed and sealed together. Next, the mixture is exposed to a negative pressure (e.g., vacuum) at 64 to promote removal of gases from the mixture followed by the application of a compressive force to consolidate the thermoplastic polymer material. The compressive force applied to the mixture may be greater than or equal to about 1 MPa to less than or equal to about 30 MPa, optionally greater than or equal to about 5 MPa to less than or equal to about 25 MPa, and in certain other aspects, optionally greater than or equal to about 10 MPa to less than or equal to about 20 MPa. Such compressive force may be applied by the complementary parts of a die or tool being forced together to compress the mixture.

In this manner, at step 64, the mixture has gases removed and is compressed and densified. As appreciated by those of skill in the art, 64 may involve two concurrent processes or may be conducted as distinct processes, for example, closing the complementary parts of a tool having the applied mixture, using a vacuum skirt to seal the tool followed by drawing a vacuum and remove gases from the mixture, followed by optionally moving the complementary portions of the tool together to applying compressive force to the mixture to compress and densify the mixture. In this step 64, when compressive force is applied, the thermoplastic polymer material melts and flows. Some of these processes may occur concurrently. At 66, the tool is cooled and the reinforced thermoplastic composite part is cooled in the die, the distinct portions of the tool are opened, and the compression molded reinforced thermoplastic composite part is removed from the die.

As will be discussed further herein, the processes according to certain aspects of the present disclosure that employ a co-spraying technique for forming a molded thermoplastic composite component advantageously employ fewer process steps, eliminating the need for dry sheet manufacturing, pattern cutting, including advantageously reducing significant amount of scrap formation that cannot be recycled or reused in this process, preheating in an oven, transferring to a tool, followed by draping, for example. Thus, the processes of the present disclosure modify a blank manufacturing process to a near net shape production process in that the processes of the present disclosure provide the ability to directly form a near-net shaped composite part in the tool without forming or processing a blank prior to compression molding. Further, the processes according to certain aspects of the present disclosure eliminate the need for potential use of end-of-arm tooling in forming complex parts. The processes according to certain aspects of the present disclosure provide good distribution of the thermoplastic polymer around the reinforcement fibers, because spraying the thermoplastic resin in a powder form can allow good uniformity of the resin in the fiber mixture. Further, the present methods provide more even distribution or concentration of fibers with the thermoplastic polymer matrix, as desired. The methods of the present disclosure also provide the ability to customize materials in different regions of the tool, so that different regions of the fiber reinforced thermoplastic composite component may have different materials and preselected properties to enhance composite part quality. In certain variations by way of example, a first reinforcement fiber may be used in a first region, while a second reinforcement fiber may be used in a second region. Or a first reinforcement fiber may be used in a first region having a first length, while a second reinforcement fiber having the same composition but a different second length may be used in a second region. Lastly, fiber reinforced thermoplastic composite components formed in accordance with certain aspects of the present disclosure have improved ultraviolet radiation (UV) stability during melting and consolidation, because much of the process can be conducted in a closed tool under vacuum where contact with oxygen in the air is avoided. Generally, the longer the thermoplastic material remains in a molten state in an oxygen environment, the more susceptible it is to UV attack. In the methods according to certain aspects of the present disclosure, an amount of time that the thermoplastic material remains in a molten state is minimized, so that in combination with minimal exposure to oxygen, the UV stability is enhanced.

Figure 2A:
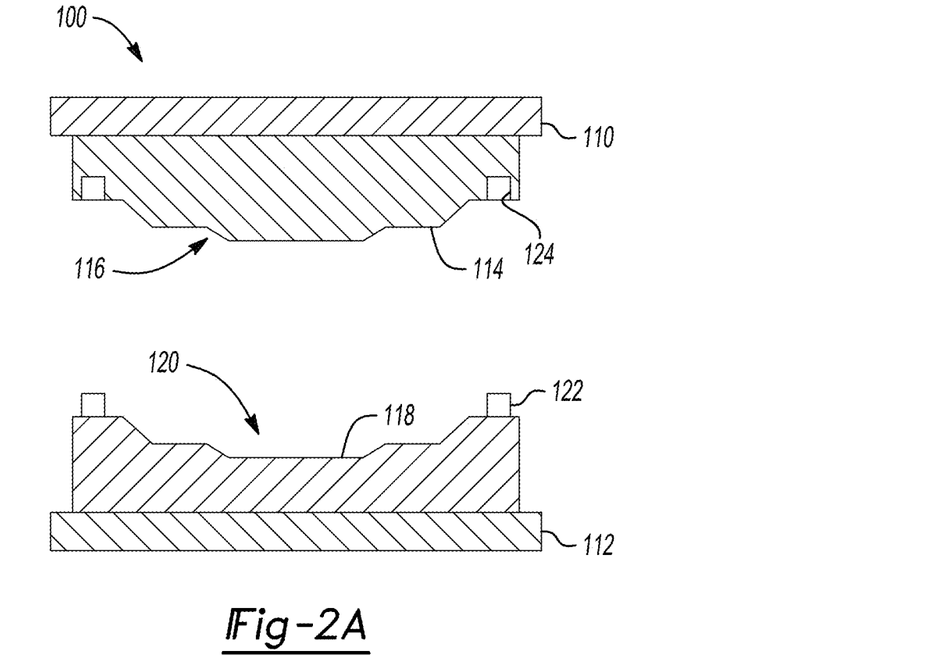
FIGS. 2A-2G show a process of forming a near-net thermoplastic composite component by spray chopping according to certain aspects of the present disclosure.

FIGS. 2A-2F show a process according to certain aspects of the present disclosure that employs a co-spraying technique for forming a molded thermoplastic composite component. In FIG. 2A, a tool 100 is a multi-part tool having a first portion 110 and a second portion 112. The first portion 110 defines a first contoured surface 114 that defines a protruding region 116. The second portion 112 defines a second contoured surface 118 in the interior that defines a cavity region 120. The first contoured surface 114 has a complementary profile to the second contoured interior surface 118, such that they are nestingly mateable with one another. In this manner, the tool may define a near-net component shape that forms a finally formed part that requires little or no further shaping or processing. The second portion 112 has pegs 122 that can be received in corresponding openings 124 in the first portion 110. As will be described further below, the first portion 110 and second portion 112 thus define two complementary parts of the tool 100 that may be closed and sealed together.

Figure 2B:
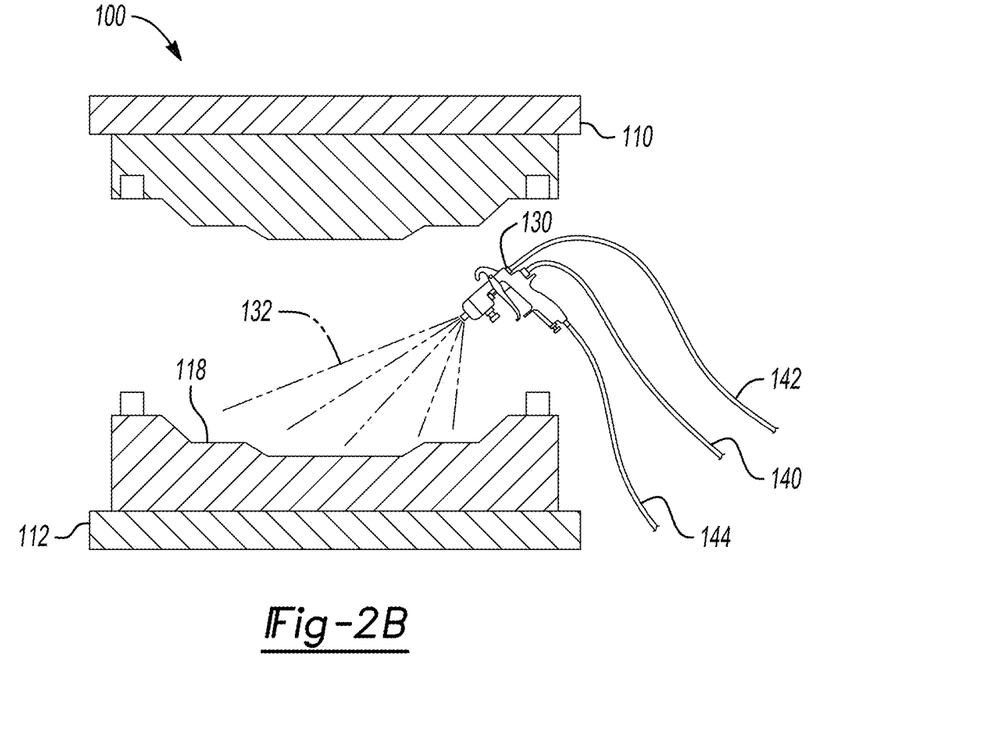

In FIG. 2B, a simplified version is depicted of a spray chopper gun device 130 being used to co-spray and deposit a mixture 132 onto the second contoured surface 118 in interior cavity region 120 of the second portion 112 of tool 100. While not shown, it should be noted that the mixture 132 could also be applied to first contoured surface 114 (either as an addition to or an alternative to spraying on the second contoured surface 118). Spray-up or spray-chopping is an open-molding technique for forming composites by spraying a polymeric resin and a chopped reinforcement onto a reusable mold or tool surface. The polymeric resin and reinforcement material may be applied separately or co-sprayed, for example chopped together in a combined stream from a chopper gun. The representative spray chopper gun device 130 has a first feed line 140 that delivers a thermoplastic polymer material, a second feed line 142 that delivers a precursor of the reinforcement material that is chopped in the spray chopper gun device 130 to form a chopped reinforcing material (e.g., plurality of chopped fibers), and a third feed line 144 to deliver pressurized gas, such as pneumatic air. In this manner, when the spray chopper gun device 130 is activated, the mixture 132 is deposited onto at least one region of the second contoured surface 118. In various aspects, the tool 100 has been heated above ambient conditions and has a first temperature. As will be described further below, the first temperature is below the solidification temperature, for example, below the melting point, of the thermoplastic polymer material. In certain aspects, the method first comprises heating the tool to the first temperature.

Figure 2C:
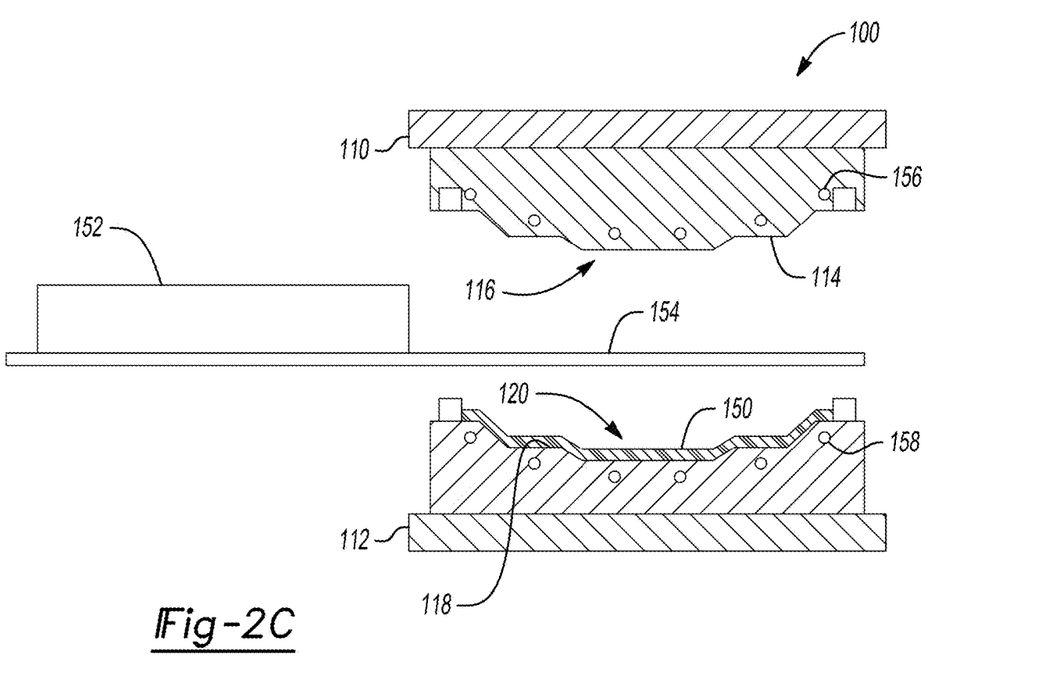

In FIG. 2C, a co-sprayed layer 150 is deposited over the second contoured surface 118. A moveable heater 152 is associated with the tool 100 equipment and can be translated into a heating position between the first portion 110 and the second portion 112 of the tool 100. The moveable heater 152 may be disposed on a slide 154, such as a rail system that surrounds the exterior of the tool. Notably, while not shown in FIGS. 2A-2B, the heater 152 and rail system or slide 154 may be present but disposed in an area peripheral to the tool 100. The moveable heater 152 may be an infrared (IR) heater or an inductive heater, by way of non-limiting example. For an induction heater, the tool may have a material coating along a surface that promotes heating in response to activation of the induction heater. In one variation, the co-sprayed layer 150 (and optionally adjacent areas of the tool) may be heated to the second temperature by heating a surface of the co-sprayed layer 150 with one or more infrared heaters, so that the thermoplastic polymer material is softened and/or melts, so that it flows during subsequent processing. In another aspect, the method may thus include heating co-sprayed layer 150 (and optionally the tool) to the second temperature by inductively heating a surface of the tool, so that the thermoplastic polymer material softens and/or melts to flow during subsequent processing.

While not shown in the other figures, FIG. 2C also shows first channels 156 present in the first portion 110 and second channels 158 present in the second portion 112. Such channels may form a grid pattern near each contoured surface of the first and second portions 110, 112 of the tool 100. Fluid may flow through the first channels 156 and second channels 158 for heat exchange to regulate temperature of each respective portion of the tool 100 by either heating or cooling the tool to an appropriate temperature.

Figure 2D:
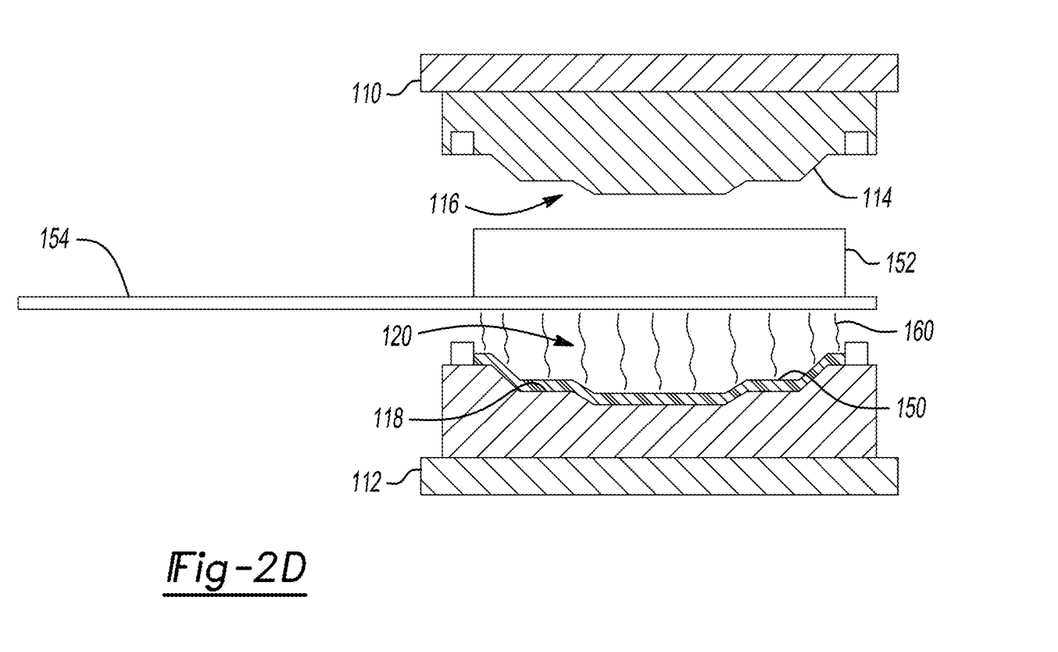

In FIG. 2D, the moveable heater 152 is translated into a heating position on the slide 154. The moveable heater 152 is thus disposed between the protruding region 116 of first portion 110 and the interior cavity region 120 of the second portion 112. In this manner, the co-sprayed layer 150 on the second contoured surface 118 has heat 160 applied from the moveable heater 152. The co-sprayed layer 150 and optionally the second contoured surface 118 of the second portion 112 are thus heated to the second temperature, while the co-sprayed layer 150 is on the tool 100. The second temperature is above the solidification temperature for example, above the melting point, of the thermoplastic polymer material. As the temperature is above the solidification temperature, the thermoplastic polymer material melts and flows in the co-sprayed layer 150.

It should be noted that the moveable heater 152 is selected to be a rapid type of heater that enables a rapid heating rate for the tool. By rapid heating, it is meant that in certain variations, the polymer may be softened or fully melted in less than or equal to about 5 minutes, optionally less than or equal to about 1 minute, and in certain variations, optionally at greater than or equal to about 10 to less than or equal to about 30 seconds. In certain variations, the tool is heated by the moveable heater 152 until at least approximately 80 to 90% by volume of the thermoplastic polymer is molten, so that the thermoplastic polymer material is softened and flowable during processing, so that it distributes over the chopped reinforcement materials distributed therein.

As noted above and described further below, the tool 100 is maintained at a first temperature, so that the tool 100 does not have to be heated from ambient conditions to the second temperature. In this manner, the heating process takes less time to achieve the melting or at least softening of the deposited thermoplastic polymer material. The first and second temperatures depend upon the properties of the thermoplastic polymer selected, but generally, the tool 100 will have a base or first temperature of greater than or equal to about 80° C. to less than or equal to about 170° C., optionally, greater than or equal to about 100° C. to less than or equal to about 150° C., optionally greater than or equal to about 110° C. to less than or equal to about 130° C., and in certain variations, optionally greater than or equal to about 120° C. to less than or equal to about 130° C.

In certain aspects, the second temperature may be greater than or equal to about 30° C. to less than or equal to about 60° C. above the solidification temperature or melting point of the thermoplastic polymer. Notably, the first portion 110 and the second portion 112 may have slightly different temperatures through the heating process, for example, deviating from one another by greater than or equal to about 5° C. to less than or equal to about 10° C.

Figure 2E:
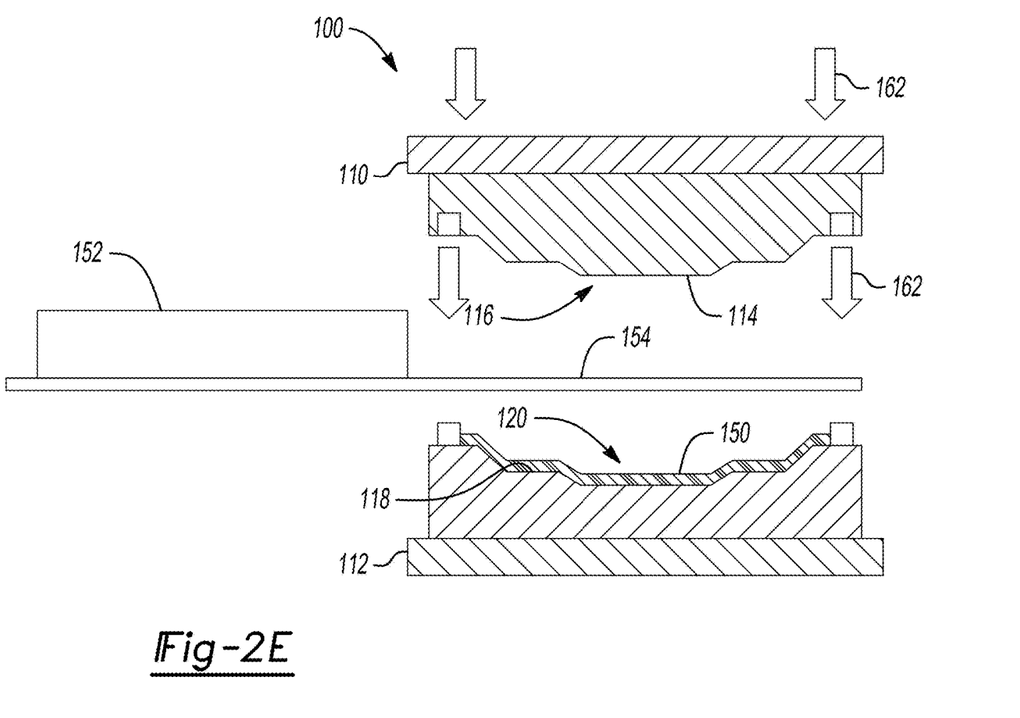
Figure 2F:
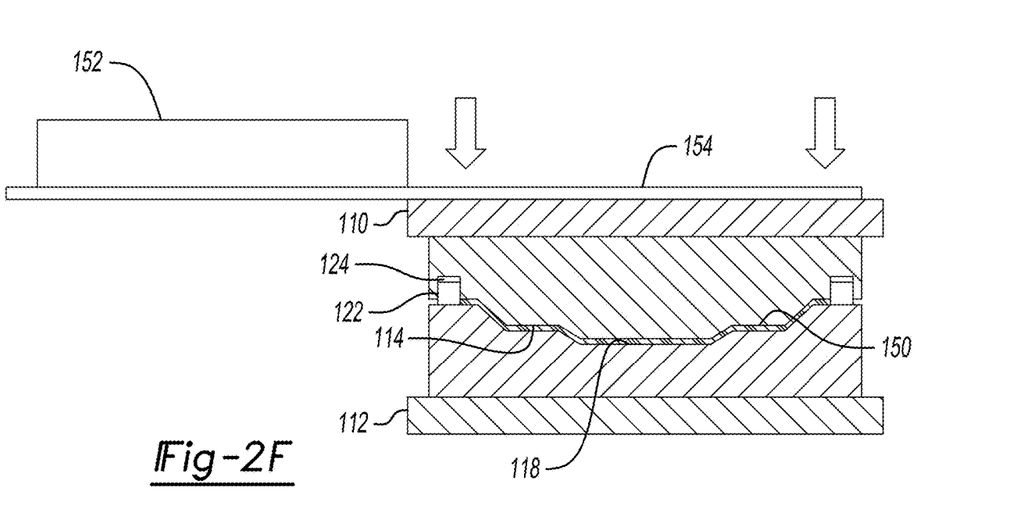

In FIG. 2E, the moveable heater 152 is translated on the slide 154 into a position on the periphery of and external to the tool 100. The first portion 110 of the tool 100 is then moved towards the second portion 112 as shown by arrows 162 so that the first contoured surface 114 on the protruding region 116 of the first portion 110 contacts the co-sprayed layer 150 and nestingly mates with the second contoured surface 118 that defines the cavity region 120 of the second portion 112. As noted above, the pegs 122 in the second portion 112 are received in corresponding openings 124 in the first portion 110. In this manner, the complementary parts of the tool 100 are closed and sealed together (FIG. 2F).

For densification and removal of gases, the co-sprayed layer 150 is then exposed to negative pressure (or a vacuum) followed by applying a compressive force. Exposing the material in the co-sprayed layer 150 to negative pressure promotes removal of gases from the mixture. During the co-spraying or co-chopping process, the pneumatic pressurized air may be incorporated as bubbles within the co-sprayed layer. Thus, the vacuum desirably reduces the amount of gas remaining the co-sprayed layer that will form the composite part. Further, as noted above, subsequent application of a compressive force also promotes flow of the heated thermoplastic polymer material, which enhances the flow around chopped reinforcing materials in layer. The co-sprayed layer may be exposed to a negative pressure or vacuum for less than or equal to about 30 seconds, optionally less than or equal to about 20 seconds, and in certain variations, optionally at greater than or equal to about 1 second to less than or equal to about 10 seconds. The vacuum pressure levels may be between greater or equal to about 20 inches of mercury (508 Torr) to less than or equal to about 29.7 inches of mercury (754 Torr), optionally greater or equal to about 20 inches of mercury (508 Torr) to less than or equal to 28 inches of mercury (711 Torr), and optionally greater or equal to about 20 inches of mercury (508 Torr) to less than or equal to about 25 inches of mercury (635 Torr).

Compressive force may be applied at the pressure ranges described previously above. The compressive force may be applied for less than or equal to about 15 minutes, optionally less than or equal to about 10 minutes, and in certain variations, optionally less than or equal to about 5 minutes.

Figure 2G:
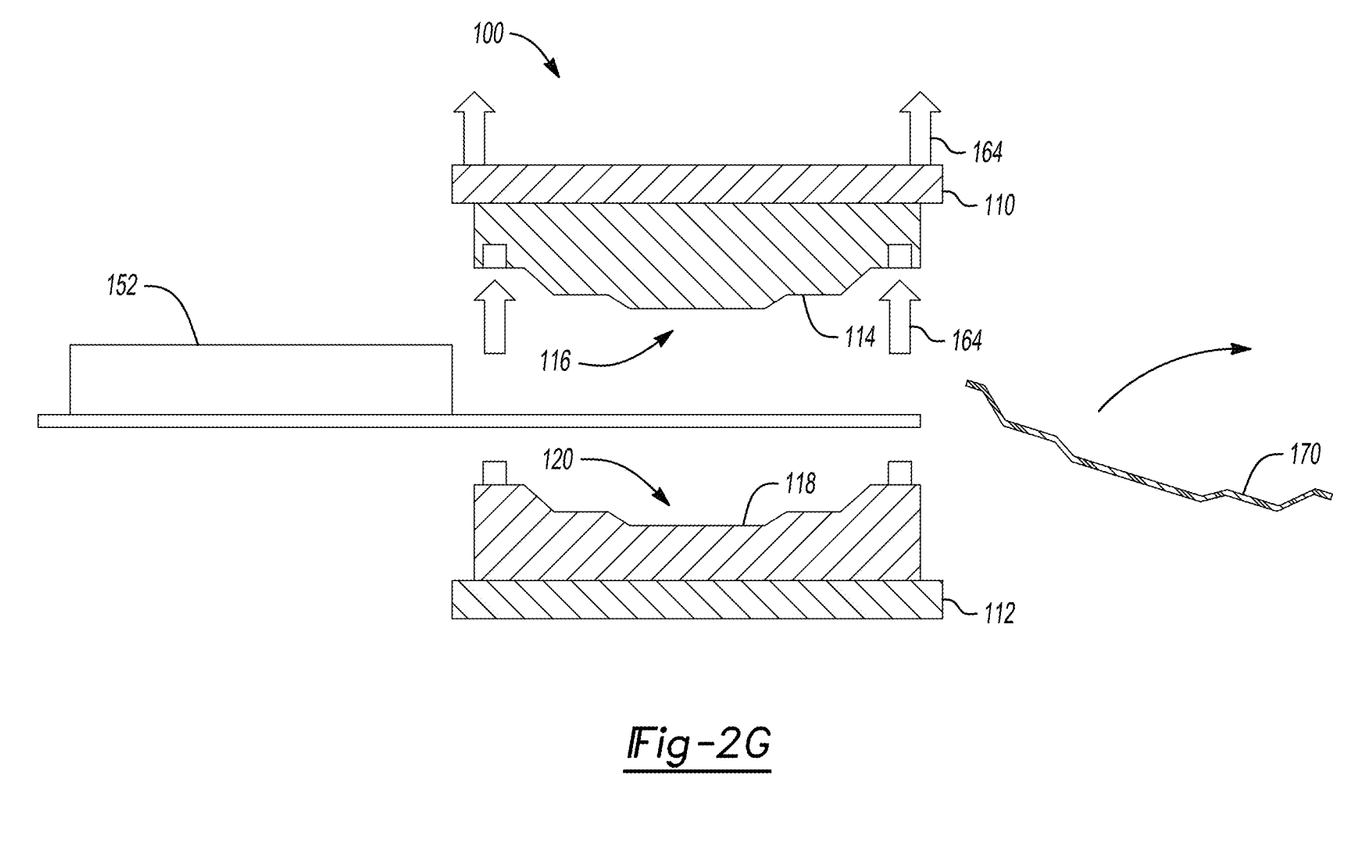

The co-sprayed layer 150 and tool 100 is then cooled back down to the first temperature, which can be accelerated by circulating coolant through the first channels 156 in the first portion 110 and second channels 158 in the second portion 112, depicted previously in FIG. 2C. and removing the mixture, After the co-sprayed layer 150 and the second contoured surface 118 of the second portion 112 and optionally the first contoured surface 114 of the first portion 110 and are cooled to the first temperature, FIG. 2G shows the first portion 110 of the tool 100 being moved away from the second portion 112 as shown by arrows 164. In certain variations, the first temperature may be in the range of any of those described above, for example, optionally about 120° C. Once the first portion 110 is moved away, the first contoured surface 114 on the protruding region 116 of the first portion 110 is no longer in contact with co-sprayed material layer 150 on the second contoured surface 118 that defines the cavity region 120 of the second portion 112. The formerly co-sprayed layer 150 has been compression molded to form a near-net thermoplastic composite component 170 having randomly oriented chopped reinforcement material distributed within a thermoplastic polymer matrix. The near-net thermoplastic composite component 170 is thus removed from the tool 100.

In certain aspects, the present disclosure contemplates a method of forming a near-net thermoplastic composite component. The method may comprise co-spraying in the form of spray chopping of a mixture comprising a thermoplastic polymer material and a chopped reinforcing material, which is deposited onto at least one region associated with a tool. The tool has a first temperature and defines a near-net component shape. The tool is heated to a second temperature while the mixture is on the tool. As discussed above, the first temperature is below the solidification temperature of the thermoplastic polymer material and the second temperature is above the solidification temperature.

The tool may comprise at least two complementary parts that are closed and sealed together prior to the exposing the mixture on the tool to the negative pressure. Then, a consolidation step is performed. For example, the mixture on the tool is exposed to a negative pressure (e.g., vacuum) to promote removal of any gases, like air, from the mixture. A compressive force is applied allowing the molten thermoplastic polymer material to flow. Finally, the applied mixture including the thermoplastic polymer material is cooled to the first temperature. The mixture is removed to form the near-net thermoplastic composite component having randomly oriented chopped reinforcement material distributed within a thermoplastic polymer matrix.

Figure 4:
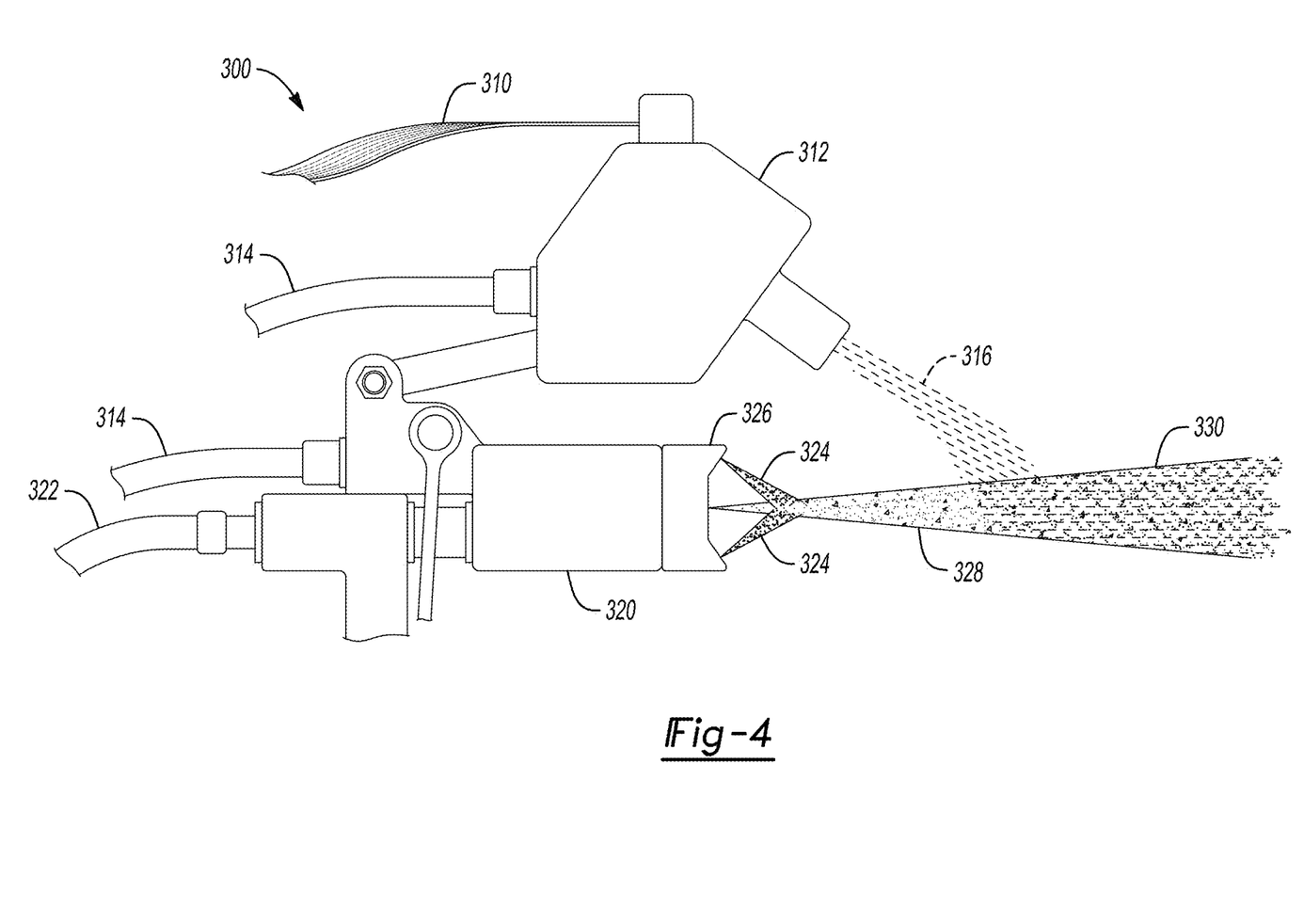
FIG. 4 shows a representative spray chopper gun for use in methods of forming a near-net thermoplastic composite component according to certain aspects of the present disclosure.

FIG. 4 depicts a more detailed non-limiting example of a spray chopper gun 300. A plurality of elongated fibers or fiber rovings 310 are introduced into a fiber chopping region 312 (including one or more internal chopper mechanisms, not shown). A pressurized air line 314 is in fluid communication with the fiber chopping region 312. The fiber rovings 310 are chopped into smaller length fibers 316 as they exit the fiber chopping region 312 of the spray chopper gun 300.

The spray chopper gun 300 also includes a thermoplastic polymer processing region 320. A thermoplastic polymer precursor 322 is fed into the thermoplastic polymer processing region 320. The thermoplastic polymer precursor 322 may be in the form of particles/powder that are jetted from the thermoplastic polymer processing region 320. Alternatively, the thermoplastic polymer precursor 322 may itself be one or more elongated fiber(s) that are similarly chopped into smaller segments as occurs in the fiber chopping region 312, in which case the thermoplastic polymer processing region 320 may include one or more internal chopper mechanisms (not shown). In yet other alternative variations, liquid polymer precursors, such as oligomers or liquid caprolactam may be used instead of solid powder spray or solid fibers. As shown, at least one pressurized air line 314 is in fluid communication with the thermoplastic polymer processing region 320 and are used to create a spray or jet of air 324 that exits a nozzle 326. A stream 328 of thermoplastic polymer is created, where the thermoplastic polymer may be in the form of binder particles or chopped fibers. The jets of air 324 combine with the thermoplastic polymer to form stream 328 which causes atomization or spreads the stream of the thermoplastic polymer or powdered thermoplastic polymer. A spray jet stream 330 is created where the atomized thermoplastic polymer in stream 328 combines with the chopped fibers 316. This spray jet stream 330 is directed towards a target region of the substrate where it is to be applied, resulting in co-spraying or spray chopping of the thermoplastic polymer and chopped reinforcement materials together. As noted above, the relative spray rates of the smaller length fibers 316 exiting the fiber chopping region 312 and atomized thermoplastic polymer in stream 328 can be varied to vary amounts of each as they are co-sprayed on the target surface.

In certain variations, the thermoplastic polymer material and the chopped reinforcing material are electrostatically charged during the co-spraying process to have a charge opposite to that of the target. In this manner, the electrostatic charging helps the spray jet stream 330 to selectively deposit onto the at least one region associated with the tool having the opposite charge to the spray jet stream 330.

The applied co-sprayed layer may have a thickness of greater than or equal to about 1 mm to less than or equal to about 25 mm, optionally greater than or equal to about 3 mm to less than or equal to about 15 mm, further optionally greater than or equal to about 5 mm to less than or equal to about 10 mm prior to subsequent processing in the tool/mold.

The thermoplastic polymer material may be in the form of a powder, where an average particle diameter of the particles is greater than or equal to about 0.3 µm to less than or equal to about 300 µm, optionally greater than or equal to 50 µm to less than or equal to about 100 µm.

Where the thermoplastic polymer precursor is an elongated fiber or string(s), a first diameter of the thermoplastic polymer material may be greater than or equal to about 0.5 to less than or equal to about 3 times a second diameter of the fiber of the reinforcing material.

An amount of a thermoplastic polymer matrix in the thermoplastic composite component formed may be greater than or equal to about 40 volume % to less than or equal to about 95 volume %, alternatively the thermoplastic polymer matrix may be greater than or equal to about 50 volume % to less than or equal to about 85 volume %, and optionally greater than or equal to about 65% to less than or equal to about 75 volume % such that the amount of the chopped reinforcement material is present at greater than or equal to about 5 volume % to less than or equal to about 60 volume %, optionally greater than or equal to about 15 volume % to less than or equal to about 50 volume %, and optionally greater than or equal to 25 volume % to less than or equal to 35 volume %.

As noted above, the co-spraying process involving a spray chopper gun 300 introduces air into the deposited layer due to air being present in the spray jet stream 330, which is later removed by the consolidation process where the sprayed layer is exposed to negative pressures (e.g., a vacuum). As will be appreciated by those of skill in the art, the relative amounts of the thermoplastic polymer and chopped reinforcement materials introduced into the spray jet stream 330 can be varied during the spray chopping process to result in different concentrations of each component in different regions of the sprayed layer.

In certain variations, at least one region associated with a surface on the tool comprises a first region and a second distinct region. The first region comprises a first material composition and the second distinct region has a second material composition. The first material composition and the second material composition are distinct from one another. In certain aspects, the first material composition and second material composition may share the same thermoplastic polymer material and chopped reinforcement material, but the chopped reinforcement materials in the first material composition may have a different length than the chopped reinforcement material in the second region.

Thus, the co-sprayed layer may have different compositions in different regions due to the incorporation of reinforcement materials having different lengths. This may be achieved by adjusting the configuration of the choppers in the fiber chopping region 312 so that one configuration results in shorter fibers, as where a second configuration results in longer fibers. Thus, length of the fibers is adjusted by changing the configuration of the chopping section in the spray chopper so that there are fewer chops per rotation of the rollers. Generally, longer fibers result in a higher strength and stiffer material, as where shorter fibers provide a more flexible material. For example, in one variation, at least one region associated with a surface on the tool comprises a first region and a second distinct region. The first region comprises a first material composition comprising a thermoplastic polymer material and a first chopped reinforcing material having a first length. The second distinct region has the thermoplastic polymer material and a second chopped reinforcing material having a second length distinct from the first length.

In one variation, the first region comprises a first material composition comprising a first amount of the thermoplastic polymer material and a second amount of the chopped reinforcing material. In certain aspects, a concentration of chopping reinforcing material (e.g., fiber) in the thermoplastic polymer material can be changed by changing the speed of the chopper in the fiber chopping region 312. The second distinct region has a second material composition comprising a third amount of the thermoplastic polymer material and a fourth amount of the chopped reinforcing material. The first amount and third amount of thermoplastic polymer materials are distinct from one another and the second amount and the fourth amount of chopped reinforcing materials are distinct from one another.

In a further variation, the spray chopper can apply co-sprayed materials at different thicknesses in different regions. For example, at least one region associated with a surface on the tool comprises a first region and a second distinct region. The first region may have a material composition comprising thermoplastic polymer and chopped reinforcement material applied at a first thickness. The second distinct region has the same material composition applied at a second thickness. The first thickness is distinct from the second thickness.

Additionally, different reinforcement materials can be fed to the spray chopper gun 200 during the deposition process, such that the co-sprayed layer may have different compositions in different regions due to the incorporation of different reinforcement materials. For example, in one variation, at least one region associated with a surface on the tool comprises a first region and a second distinct region. The first region comprises a first material composition comprising a thermoplastic polymer material and a first chopped reinforcing material. The second distinct region has the thermoplastic polymer material and a second chopped reinforcing material. The first and second chopped reinforcing materials are distinct from one another. In this variation, the first region may have distinct mechanical properties from the second region, for example, higher strength.

In various aspects, the co-spraying process employing a spray chopper desirably forms a composite having chopped reinforcement materials, e.g., fibers, distributed randomly within a thermoplastic polymer matrix.

In certain variations, the thermoplastic polymer is selected from the group consisting of: polyamides, such as nylon 6, nylon 66, nylon 12, polyethylene, polypropylene, polycarbonate, polyacrylates, polymethylmethacrylate, acrylonitrile-butadiene-styrene (ABS), polycarbonate and acrylonitrile-butadiene-styrene blend (PC-ABS), polybutylene terephthalate and polycarbonate blend (PC-PBT), polyphenylene oxide, polyetherimide, and combinations thereof. In certain variations, the thermoplastic polymer is selected from the group consisting of: nylon 6, nylon 66, nylon 12, and combinations thereof. In certain aspects, the thermoplastic polymer comprises a polyamide formed from a caprolactam monomer, such as nylon 6.

In certain variations, the chopped reinforcing material is selected from the group consisting of: carbon fiber, glass fiber, basalt, polyparaphenylene terephthalamide (KEVLAR) fiber, hemp, kenaf, and combinations thereof. In certain aspects, the chopped reinforcing material is selected from the group consisting of: carbon fiber, glass fiber, and combinations thereof. In other aspects, the reinforcing material comprises carbon fiber.

In certain aspects, the thermoplastic polymer is selected from the group consisting of: polyamides, such as nylon 6, nylon 66, nylon 12, and combinations thereof. The chopped reinforcing material is selected from the group consisting of: carbon fiber, glass fiber, and combinations thereof.

In yet other aspects, other methods of forming a near-net thermoplastic composite component are provided. The methods may include co-spraying a mixture comprising a thermoplastic polymer material and a chopped reinforcing material onto at least one region of a perforated screen disposed in a tool having a first temperature and defining a near-net component shape. Such a variation is shown in FIGS. 3A-3D, which is an alternative process to that shown in FIGS. 2A-2D.

Figure 3A:
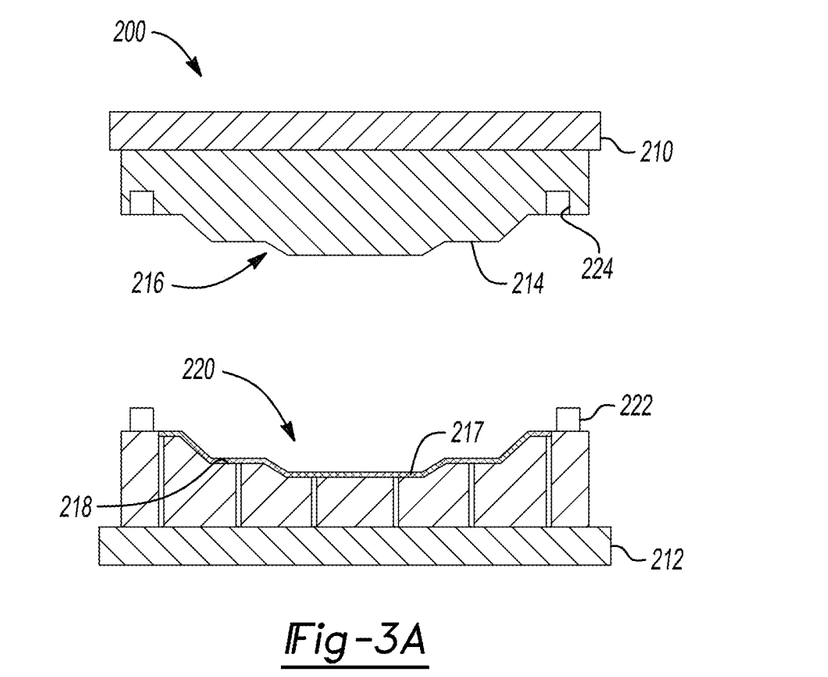
FIGS. 3A-3D show an alternative process of forming a near-net thermoplastic composite component by spray chopping according to certain aspects of the present disclosure.

In FIG. 3A, a tool 200 is a multi-part tool having a first portion 210 and a second portion 212. The first portion 210 defines a first contoured surface 214 that defines a protruding region 216. The second portion 212 comprises a screen 217 having a plurality of perforations or holes (not shown). In certain aspects, the screen 217 may have about 30 to about 80% of openings in the screen's surface, as where about 20 to about 70% of the surface area is metal, so that sprayed material is retained on the screen 217. Alternatively, the screen 217 may have between about 40 to about 60% of the screen's surface as openings, while about 40 to about 60% of the surface area is metal. The openings in the screen may be any shape, e.g., circular, oval, rectangular, and the like. The longest dimension of the openings may be from greater than or equal to about 3 mm to less than or equal to about 12 mm, alternatively from greater than or equal to about 5 mm to less than or equal to about 10 mm. The screen 217 is complementary with and nestingly mates against a corresponding second contoured surface 218 in the interior of the second portion 212. The screen 217 and second contoured surface 218 together defines a cavity region 220. The first contoured surface 214 also has a complementary profile to the screen 217 and the second contoured surface 218, such that the screen 217 and the first contoured surface 214 are nestingly mateable with one another. In this manner, the tool 200 may define a near-net component shape that forms a finally formed part that requires little or no further shaping or processing. The second portion 212 has pegs 222 that can be received in corresponding openings 224 in the first portion 210 when the two complementary first and second portions 210, 212 of the tool 100 are closed and sealed together.

Figure 3B:
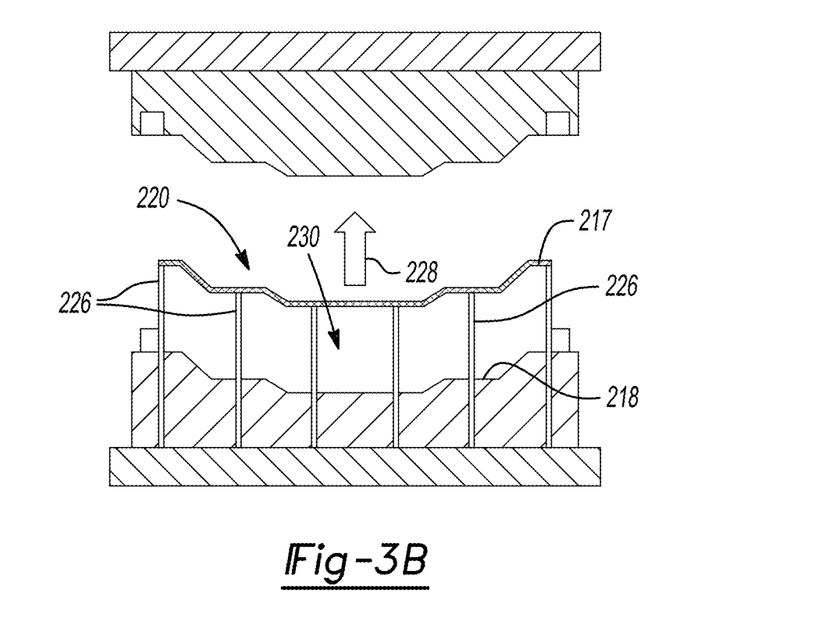

In FIG. 3B, the screen 217 is connected to a plurality of push rods 226 that extend from the second portion 212. When the push rods 226 are actuated in a first direction, the screen 217 is lifted up and away from the second contoured surface 218, as shown by arrow 228. Thus, an open space 230 is defined between the second contoured surface 218 and screen 217.

Figure 3C:
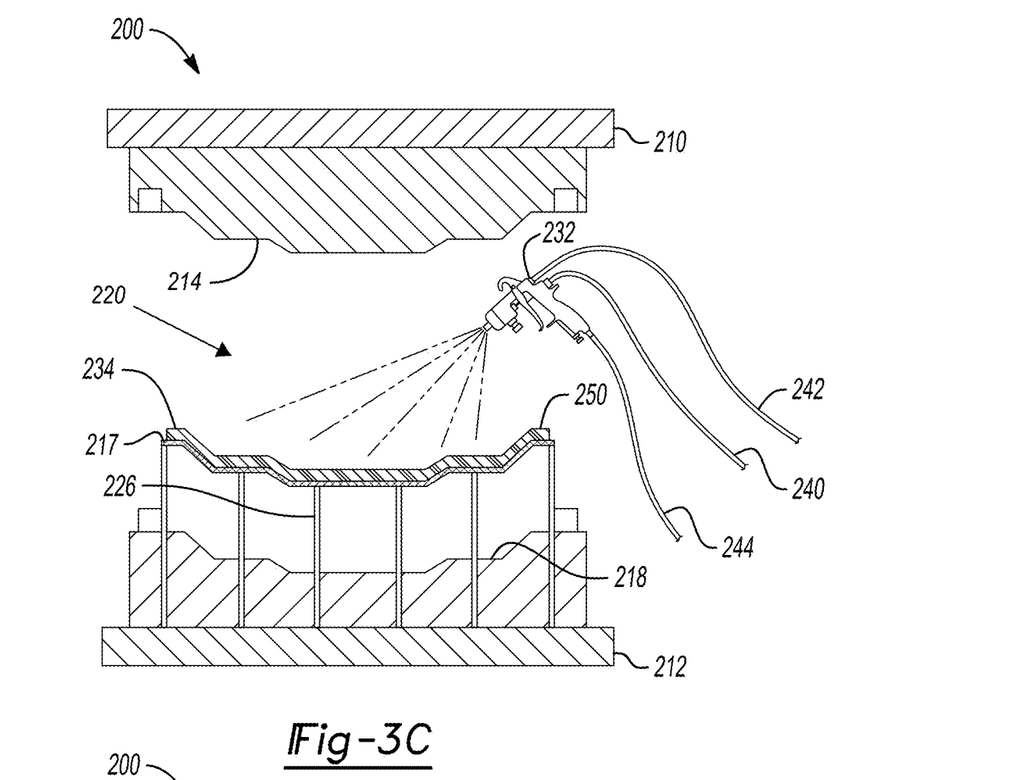

In FIG. 3C, a simplified version is depicted of a spray chopper gun device 232 being used to co-spray and deposit a mixture 234 onto the screen 217 in interior cavity region 220 of the second portion 212 of tool 200. The spray chopper gun device 232 has a first feed line 240 that delivers a thermoplastic polymer material (e.g., a powder thermoplastic polymer), a second feed line 242 that delivers a precursor of the reinforcement material that is chopped in the spray chopper gun device 232 to form a chopped reinforcing material (e.g., plurality of chopped fibers), and a third feed line 244 to deliver pressurized gas, such as pneumatic air. In this manner, when the spray chopper gun device 232 is activated, the mixture 234 is deposited via spraying onto at least one region of the screen 217 to form a co-sprayed layer 250. The perforations or openings in the screen 217 facilitate air in the sprayed stream passing through the screen 217 into the open region 230, while the thermoplastic material and chopped reinforcement materials are retained on the screen 217. In this manner, less entrained air remains in the co-sprayed layer 250 that is formed on the screen 217.

Figure 3D:
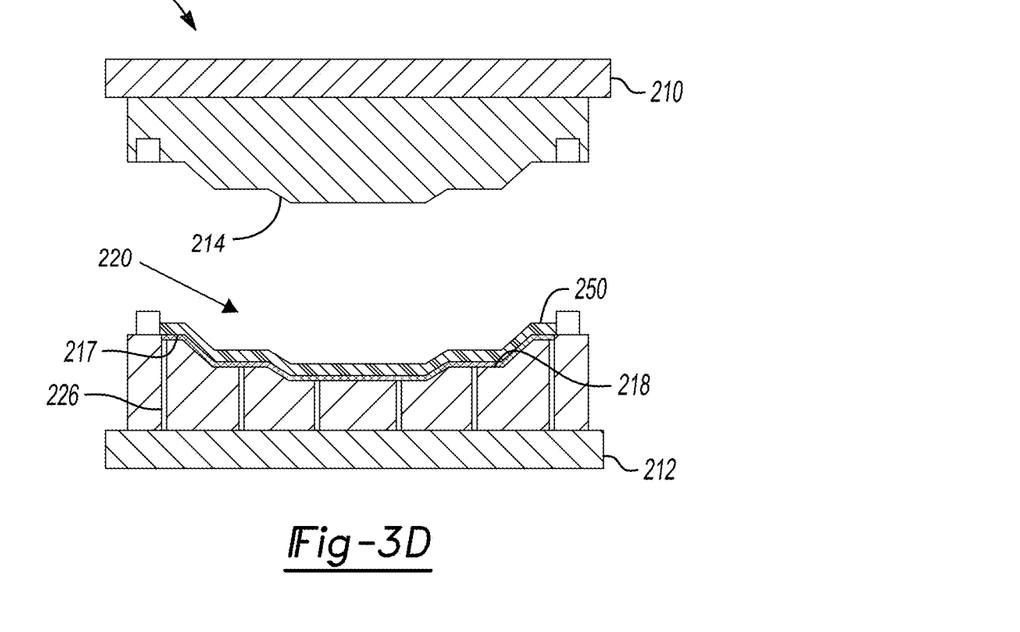

In FIG. 3D, the plurality of push rods 226 are actuated in a second direction opposite to the first direction 228 shown in FIG. 3B, so that the screen 217 is retracted back into contact with the second contoured surface 218. Thus, while the co-spraying process is conducted, the perforated screen 217 is raised above a surface of the second portion 212 of the tool 200 to promote fluid flow through the perforated screen 217 during the co-spraying. Prior to consolidation by exposing the co-sprayed layer 250 to negative pressure and applied compressive force, the screen 217 is translated adjacent to the second contoured surface 218 of the tool 200.

The method may then proceed as described previously in the context of FIGS. 2C-2G, including the heating, removal of gases from the applied material layer and densification (e.g., consolidation), and cooling steps. In the final step, shown in FIG. 2G, the near-net thermoplastic composite component having randomly oriented chopped reinforcement material distributed within a thermoplastic polymer matrix is removed from the screen 217 in the second portion 212 of the mold 200.

Additionally, it will be appreciated that the moveable heaters, like those described above and shown in FIGS. 2C and 2D, can be slid near the co-sprayed layer 250 for heating in the variation shown in FIGS. 3A-3D. For example, while not shown in the figures, in one aspect, the moveable heater can be slid between the first contoured surface 214 and the screen 217 having the co-sprayed layer 250 either when the pushrods are actuated in the position like that shown in FIG. 3C or when the pushrods 226 are retracted like in FIG. 3D. In other variations, the moveable heater can be slid into the open space 230 between the screen 217 having the co-sprayed layer 250 and the second contoured surface 218 while the pushrods 226 are actuated in the first direction 228 as shown in FIG. 3C. Thus, the heating may occur between the steps illustrated in FIGS. 3C and 3D, meaning that the heating unit may translate between the co-sprayed layer 250/screen 217 assembly and either the first or second contoured surfaces 214, 218 to heat the co-sprayed thermoplastic material layer 250. In certain aspects, the heating may be conducted while the screen 217 and co-sprayed layer 250 are actuated in the first direction 228 by the pushrods 226 as shown in FIG. 3C and thus prior to the retraction of the screen 217 back into contact with the second contoured surface 218 as illustrated in FIG. 3D. In certain aspects, this may provide for improved melting of the thermoplastic polymer matrix in the co-sprayed layer 250.

The present disclosure thus provides new methods of forming a near-net thermoplastic composite component that can eliminate the blanking operation by spraying randomly oriented chopped fibers along with thermoplastic resin powder directly onto a part tool. In this regard, the processes of the present disclosure are blank-free. Thermoplastic materials however are mostly solid at ambient temperatures and requires high heat and pressure to flow. However, the present disclosure provides uses rapid heaters, for example, induction-heated tools or infrared heaters for rapid heating of the thermoplastic resin above its melting point prior to tool closing. Material is then heated, consolidated, and cooled in the tool to make a near-net thermoplastic composite component or part having randomly oriented chopped reinforcement material distributed within a thermoplastic polymer matrix with minimal material waste.

The present methods provide improved polymer distribution in such compression molded thermoplastics by spraying the thermoplastic resin in a powder or chopped fiber form that allows good uniformity of the thermoplastic polymer in the fiber mixture. Further, using a vacuum removes entrapped air prior to complete tooling pressurization. The rapid cooling of the melt can be accomplished via water cooled lines in the tooling.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a near-net thermoplastic composite component comprising:
co-spraying a mixture comprising a thermoplastic polymer material and a chopped reinforcing material to directly deposit the mixture onto at least one region associated with a tool having a first temperature and defining a near-net component shape;
heating the mixture to a second temperature while the mixture is on the tool, wherein the first temperature is below the solidification temperature of the thermoplastic polymer material and the second temperature is above a solidification temperature of the thermoplastic polymer material, so that the thermoplastic polymer material flows;
exposing the mixture on the tool to a negative pressure to promote removal of gases from the mixture;
applying compressive force to the mixture; and
cooling the tool to the first temperature and removing the mixture to form the near-net thermoplastic composite component having randomly oriented chopped reinforcement material distributed within a thermoplastic polymer matrix.

2. The method of claim 1, wherein the at least one region associated with a tool comprises a first region and a second distinct region, wherein the mixture is deposited onto the first region to define a first material composition and the mixture is deposited onto the second distinct region to define a second material composition, and wherein the first material composition and the second material composition are distinct from one another.

3. The method of claim 1, further comprising heating the tool to the first temperature.

4. The method of claim 1, wherein the heating the mixture to the second temperature comprises inductively heating a surface of the tool so that the thermoplastic polymer material melts and flows during the applying compressive force to the mixture.

5. The method of claim 1, wherein the heating the mixture to the second temperature comprises heating the mixture with one or more infrared heaters so that the thermoplastic polymer material melts and flows during the applying compressive force to the mixture, wherein the one or more infrared heaters are movable relative to the tool and are moved over the tool after the co-spraying and removed prior to the applying compressive force to the mixture.

6. The method of claim 1, wherein the tool comprises at least two complementary parts that are closed and sealed together prior to the exposing the mixture on the tool to the negative pressure and the applying compressive force to the mixture.

7. The method of claim 1, wherein the chopped reinforcing material is selected from the group consisting of: carbon, glass, basalt, polyparaphenylene terephthalamide, hemp, kenaf, and combinations thereof and the thermoplastic polymer is selected from the group consisting of: nylon 6, nylon 66, nylon 12, polyethylene, polypropylene, polycarbonate, polyacrylates, polymethylmethacrylate, acrylonitrile-butadiene-styrene (ABS), polycarbonate and acrylonitrile-butadiene-styrene blend (PC-ABS), polybutylene terephthalate and polycarbonate blend (PBT and PC), polyphenylene oxide, polyetherimide, and combinations thereof.

8. The method of claim 1, wherein the thermoplastic polymer material is in the form of a powder having an average particle diameter of greater than or equal to about 0.3 µm to less than or equal to about 300 µm.

9. The method of claim 1, wherein an amount of a thermoplastic polymer matrix in the near-net thermoplastic composite component is greater than or equal to about 40 volume % to less than or equal to about 95 volume %.

10. The method of claim 1, wherein the thermoplastic polymer material and the chopped reinforcing material are electrostatically charged during the co-spraying to facilitate the depositing onto the at least one region associated with the tool.

11. The method of claim 1, wherein the co-spraying comprises:
spray chopping the mixture comprising the thermoplastic polymer material and the chopped reinforcing material is directly deposited onto the at least one region associated with the tool having the first temperature.

12. The method of claim 11, wherein the spray chopping comprises feeding the thermoplastic polymer material as a powder into a spray chop gun and also feeding a fiber of the chopped reinforcing material into the spray chop gun to form the chopped reinforcing material that is directly deposited onto at least one region.

13. The method of claim 11, wherein the spray chopping comprises feeding a string of thermoplastic polymer material into a spray chop gun and also feeding a fiber of the chopped reinforcing material into the spray chop gun that forms chopped thermoplastic polymer material and the chopped reinforcing material is directly deposited onto the at least one region.

14. The method of claim 13, wherein a first diameter of the string of the thermoplastic polymer material is greater than or equal to about 0.5 to less than or equal to about 3 times a second diameter of the fiber of the chopped reinforcing material.

15. The method of claim 11, wherein the chopped reinforcing material is selected from the group consisting of: carbon, glass, basalt, polyparaphenylene terephthalamide, hemp, kenaf, and combinations thereof and the thermoplastic polymer is selected from the group consisting of: nylon 6, nylon 66, nylon 12, polyethylene, polypropylene, polycarbonate, polyacrylates, polymethylmethacrylate, acrylonitrile-butadiene-styrene (ABS), polycarbonate and acrylonitrile-butadiene-styrene blend (PC-ABS), polybutylene terephthalate and polycarbonate blend (PBT and PC), polyphenylene oxide, polyetherimide, and combinations thereof.

16. The method of claim 11, wherein the thermoplastic polymer material and the chopped reinforcing material are electrostatically charged during the spray chopping to facilitate the direct depositing onto the at least one region associated with the tool.

17. The method of claim 2, wherein the first material composition comprises a first chopped reinforcing material having a first length and the second material composition comprises a second chopped reinforcing material having a second length that is different from the first length.

18. The method of claim 2, wherein the first material composition comprises a first volume percent of the thermoplastic polymer material and a second volume percent of the chopped reinforcing material and the second material composition comprises a third volume percent of the thermoplastic polymer material and a fourth volume percent of the chopped reinforcing material, and wherein the first volume percent and the third volume percent of the thermoplastic polymer material are different and the second volume percent and the fourth volume percent of the chopped reinforcing material are different.

19. The method of claim 2, wherein the first material composition is deposited at a first thickness and the second material composition is deposited at a second thickness that is different from the first thickness.

20. The method of claim 2, wherein the first material composition comprises a first chopped reinforcing material and the second material composition comprises a second chopped reinforcing material that is different from the first chopped reinforcing material.

* * * * *